Jan. 8, 1952     T. H. CLACK     2,582,008
HAND LOOM

Filed May 5, 1947     5 Sheets-Sheet 1

Inventor
Thomas H. Clack
By
Bailey, Stephens & Huettig
Attorney

Jan. 8, 1952     T. H. CLACK     2,582,008
HAND LOOM

Filed May 5, 1947     5 Sheets-Sheet 2

Inventor
Thomas H. Clack

By Bailey, Stephens & Huettig
Attorney

Jan. 8, 1952 T. H. CLACK 2,582,008
HAND LOOM
Filed May 5, 1947 5 Sheets-Sheet 3

Inventor
Thomas H. Clack
By Bailey, Stephens & Huettig
Attorney

Jan. 8, 1952   T. H. CLACK   2,582,008
HAND LOOM

Filed May 5, 1947   5 Sheets-Sheet 4

Inventor
Thomas H. Clack
By
Bailey, Stephens & Huettig
Attorney

Jan. 8, 1952 T. H. CLACK 2,582,008
HAND LOOM
Filed May 5, 1947 5 Sheets-Sheet 5

Inventor
Thomas H. Clack
By
Bailey, Stephens & Huettig
Attorney

Patented Jan. 8, 1952

2,582,008

UNITED STATES PATENT OFFICE 2,582,008

HAND LOOM

Thomas H. Clack, South Norwalk, Conn.

Application May 5, 1947, Serial No. 745,958

4 Claims. (Cl. 139—33)

This invention is directed to a hand loom of simple construction and operation, and to which attachments may be added so that relatively complicated twill weaving can be done on a simple loom.

Various attempts to construct a loom for hand weaving have met with the objections that either the loom was too complicated and cumbersome to be operated successfully by an unskilled person, or the loom was of such size and proportions that only a narrow strip of material, such as a scarf or a tie, could be woven. In the latter instance, only the simplest basket weave could be made. Previous attempts to construct a loom for hand weaving in which more elaborate patterns are desired, such as twills, have required that a harness be built for the loom in order that the multiple heddles could be operated. A further objection to the heretofore known hand looms has been that, owing to the construction of the loom, only a small amount of cloth could be woven before the cloth had to be rolled up on the take-up roller. All these factors have made the construction of hand looms expensive, awkward and too complicated to be used as practical household items.

It is an object of the instant invention to construct a hand loom which is inexpensive and uncomplicated. Another object of the invention is to construct a hand loom which does not need a harness in order to operate a multiple heddle in the weaving of various patterns. A further object of the invention is to construct a hand loom in which the correct contact joint of the beater can be maintained as the cloth grows upon the beam so that the necessity for taking up the cloth is not done as often as is the case with ordinary looms.

Other objects of the invention are to construct the heddles and reeds so that the dents can be assembled according to the size of warp being used and type of cloth desired; to construct a loom which can be shipped in knockdown form and assembled by the operator of the loom; and to provide simplified means for the laying out of the warp and winding the same upon the warp beam.

Further objects are to construct a loom in which the weaving frame may be tilted from a horizontal into a vertical storage space savings position without removing the warp from the frame or heddles; to form a shed by the tilting of the weaving frame while using the beater as part of the shed forming means; to eliminate a harness operated either by an overhead pull system or by treadles; to weave a piece of cloth by hand so that the operator can watch the cloth grow for a considerable distance without having to reach too far to pass the shuttle through the shed; and to provide a simple loom upon which basket weaves, twills, and oriental rugs may be woven by hand.

Generally, these objects of the invention are obtained by mounting a rectangular weaving frame upon two standards so that the frame may be tilted up and down. The warp stretched between the warp beam and cloth beam passes through heddles and a reed which are supported by swords secured to the base of the standards. The heddles may swing with the reed as the weft is beaten up. It has been discovered that this construction enables a shed to be formed when the weaving frame is tilted and the reed performs the dual function of a beater and heddle. When a simple reed is used and multiple movable heddles are supported upon the swords along with the reed, the tilting of the weaving frame allows the plane of the cloth to stay centered with respect to the horizontal center line of the reed so that the weft may be beaten up. As the cloth grows, the shed can be maintained at an adequate depth by tilting the frame upon its pivotal support and thus the shuttle can be passed through the shed even though the cloth has grown to a considerable extent upon the weaving frame. An attachment is provided for the warp beam so that the warp may be laid out, and the heddle frame is constructed to receive exchangeable dents corresponding to the type of cloth being woven.

These and other objects of the invention may be more fully understood in connection with the accompanying drawings in which.

Figure 1:
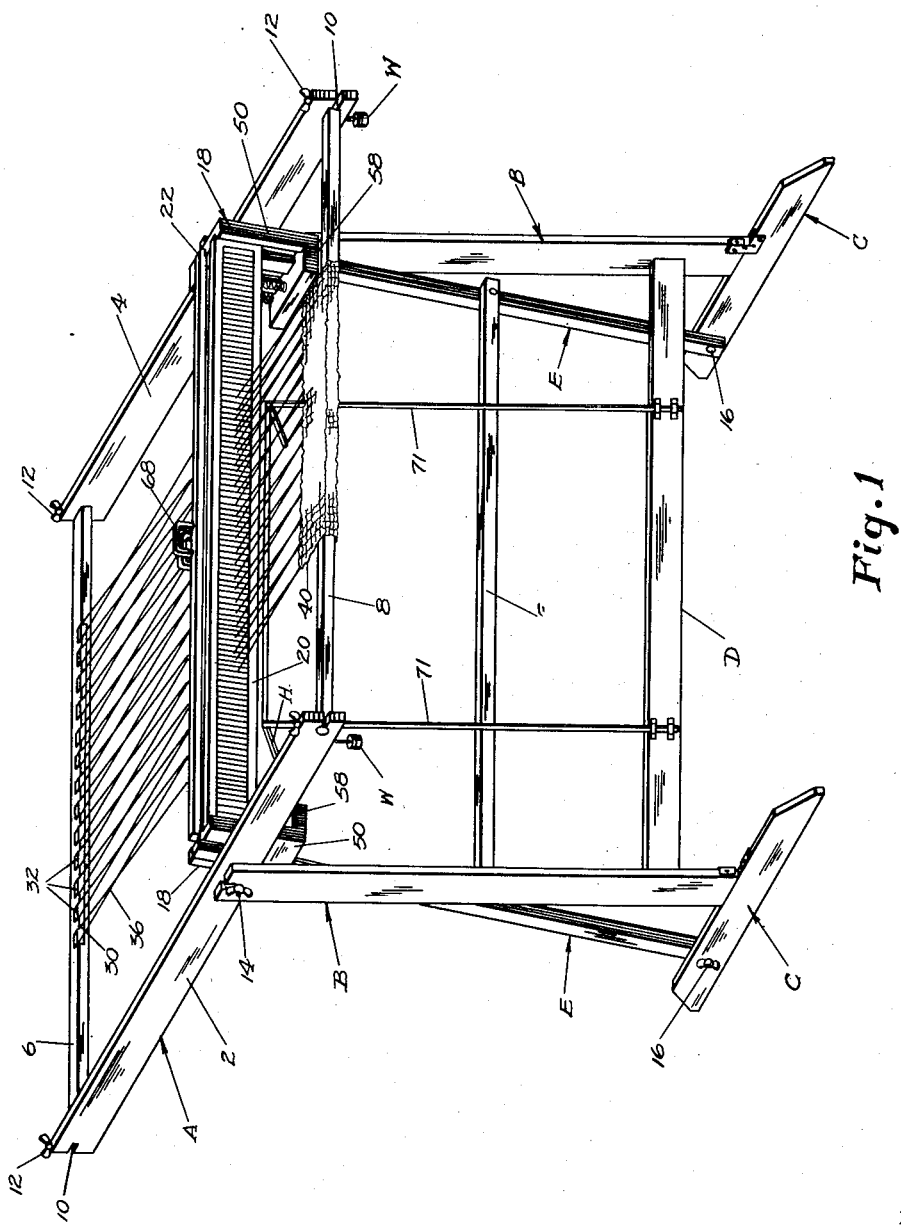
Fig. 1 is a perspective view of the loom.

Generally, my invention consists of a weaving frame A composed of side rails 2 and 4 joined at one end by a warp beam 6, and at the other end by a cloth beam 8 to complete the frame. The warp and cloth beams may be mounted in slots 10 cut in the ends of the side rails and clamped in said slots by bolts with wing nuts 12. The side rails are pivotally mounted to the upright standards B at a point about one-third the distance from the cloth beam 8 to the warp beam 6, and this pivotal mounting may be in the form of a bolt and wing nut fastener 14, so that the frictional engagement between the rails and the standards B can be adjusted.

Standards B are supported upon feet C and are braced by a cross member D. Pivotally secured to feet C at a point which lies approximately beneath the midpoint between pivot point 14 and warp beam 6 are swords E, which are secured by a bolt and wing nut 16 to the footings C and are joined by a cross brace F. The upper ends of the swords E support blocks 18 which hold a reed 20 and heddles 22 and 24.

Figure 5:
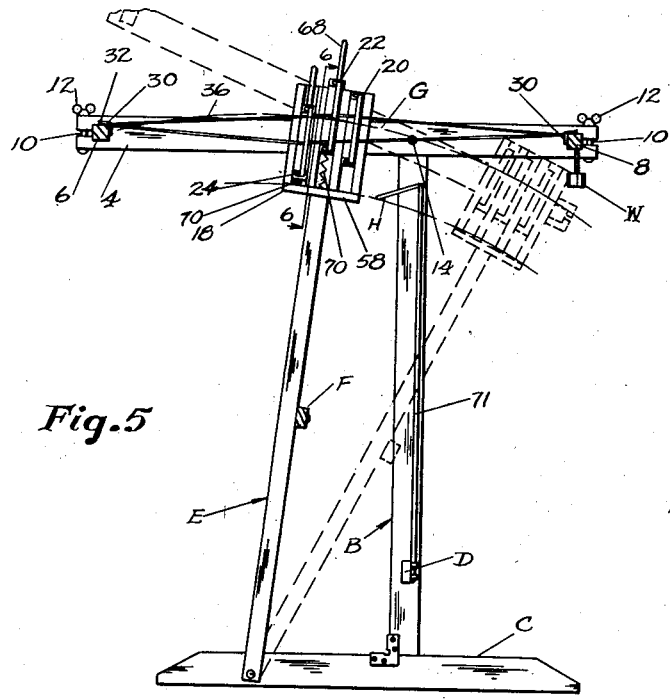
Fig. 5 is a cross-sectional view of the loom of Fig. 1.
Figure 12:
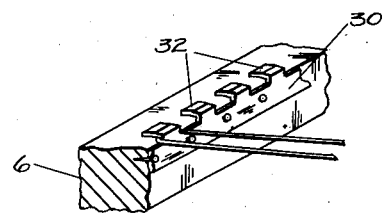
Fig. 12 is a perspective view of a portion of the warp beam.

Mounted on the warp beam is a strip of metal 30 having tongues 32 bent over the top of the warp beam 6, note Figs. 5 and 12. A warp thread 36 is caught under a tongue 32 and threaded through heddles 22 and 24, through reed 20 and secured to the cloth beam 8 by any convenient means, such as by a similar strip 30.

Figure 2:
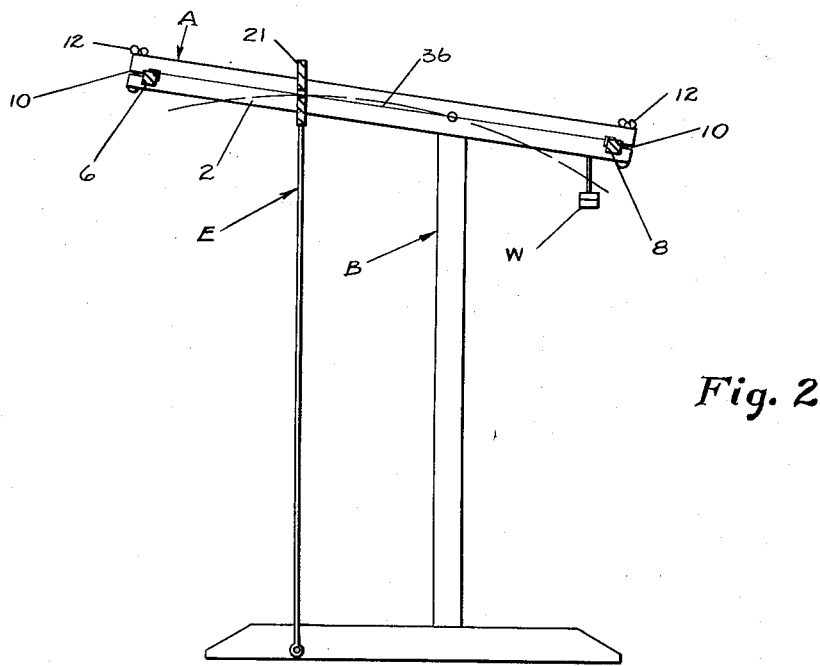
Fig. 2 is a diagrammatic view of the loom when formed with the heddle and reed combined in a single unit.
Figure 3:
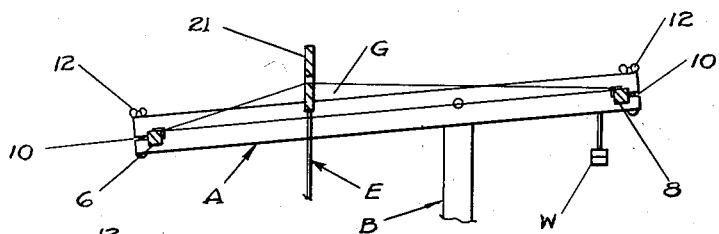
Fig. 3 is a view similar to Fig. 2, showing the formation of a shed by the uptilting of the weaving frame.
Figure 4:
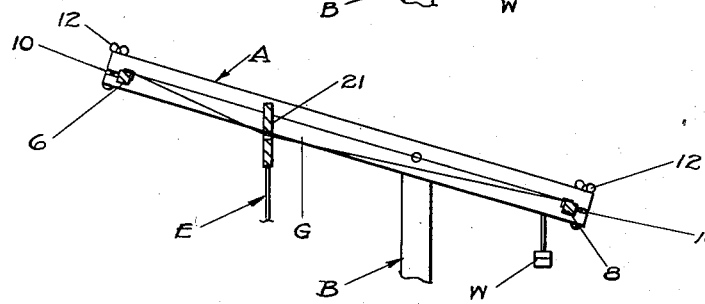
Fig. 4 is a view similar to Fig. 2, showing the formation of a counter-shed by the downtilting of the weaving frame.

The simplest embodiment of the invention is illustrated in Figs. 2 to 4 in which the reed and heddle are combined into a single structure which functions both to separate the warp in forming the shed and to beat up the weft. Such a structure is disclosed in the United States patent to F. J. Booze, No. 688,500, patented December 10, 1901. However, in such patent and in the prior art, it was necessary to move the reed and heddle vertically in order to form the shed. To the contrary, in the invention illustrated in Figs. 2 to 4, the reed and heddle 21 is rigidly fixed to the swords E and is movable with the swinging of the swords to beat up the weft. When the weaving frame A is slightly inclined as in Fig. 2, no shed exists. When the cloth beam 8 is pushed upwardly as in Fig. 3, a shed G appears, this being produced by reason of the longer lever arm between the standard B and the warp beam 6 giving a relatively great arcuate movement to the movable warp strands in the heddle upon a relatively slight movement of the cloth beam 8. After the shuttle has been passed through the shed, the weaving frame A is moved to the position of Fig. 2, and the swords E swung toward the cloth beam 8, by manually grasping the reed-heddle 21 and pulling it toward the cloth beam in order to beat up the weft. The cloth beam is then depressed as shown in Fig. 4 to form the counter-shed, the shuttle passed through the shed, frame A leveled, and the weft beaten up as before. Weights W are provided for adjacent cloth beam 8 to counterbalance the weight of the frame, the amount of weight being lessened as the cloth grows on the cloth beam side of the frame A.

The essentials of the invention are achieved by this simple construction. Harness and treadles are eliminated and weaving accomplished by the three simple manual movements of tilting the frame, passing the shuttle through the shed and swinging the reed and heddle to beat up the weft. Considerable cloth can be woven before there is need to wind it up upon the cloth beam. By moving the reed and heddle 21 adjacent standards B and then swinging the warp beam 6 downwardly, frame A can assume a substantially vertical position for storage purposes without the necessity of removing the warp from the frame.

The use of a single heddle permits only the weaving of a simple basket weave. It is possible to obtain more elaborate weaves, such as twills, by a plurality of heddles and without the necessity of using a complicated harness and treadle. As illustrated in Figs. 1 and 5, this elaborated form of the invention employs the same tiltable frame A and swords E. However, a conventional reed and multiple heddles are substituted for the combined reed and heddle unit of Figs. 2, 3 and 4. As previously stated in the description of Fig. 1, the upper ends of the swords E support blocks 18 in which a plurality of heddles may be mounted of which, for purposes of example only, two are shown.

In this embodiment of the invention, swords E are pivoted to the base C so that the horizontal center line of the reed will substantially coincide with the pivotal axis of frame A as the swords are moved toward the cloth beam 8. As the shed is to be formed by the vertical displacement of the heddles, no tilting of the frame is necessary for this function. However, in order to beat up the weft the approximate horizontal center line of the reed should contact the weft in moving it toward the cloth beam. As shown by the dotted line position of the frame and swords in Fig. 5, this is accomplished by pushing the cloth beam 8 downwardly so that the plane of the frame is substantially tangent to the arc formed by the movement of the horizontal center line of the reed. Thus the reed and frame are always relatively positionable so that the weft can be beat up firmly into the cloth from the beginning of the weaving until as much cloth as possible has been woven on the frame.

Figure 6:
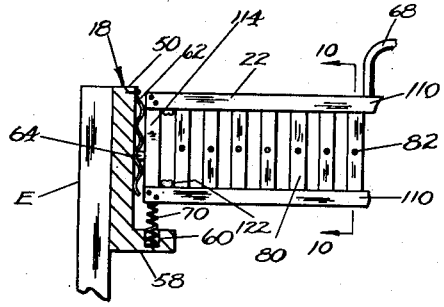
Fig. 6 is a front view of a portion of a heddle as seen on the line 6—6 of Fig. 5.
Figure 7:
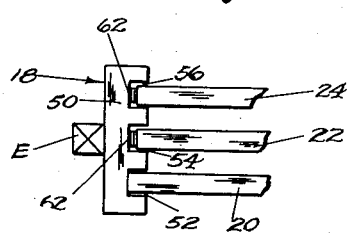
Fig. 7 is a top plan view of a portion of Fig. 5.

Block 18 is of L shape, the upper leg 50 being provided with a plurality of grooves 52, 54 and 56, note Fig. 7, and the lower leg 58 being provided with sockets 60, note Fig. 6. Groove 52 is adapted to receive reed 20 which is removably fixed in the groove in any conventional manner. Grooves 54 and 56 are adapted to receive vertically slideable heddles 22 and 24. Respectively mounted in grooves 54 and 56 are corrugated spring members 62 secured to block 18 at their upper ends and free at the lower ends, the corrugations functioning as resilient stops cooperating with stops or detents constituted by a lug 64 mounted on the end of the respective heddle. Handles 68 are secured to the heddles so that these heddles may be adjusted vertically. Thus, for purposes of illustration in Fig. 5, heddle 22 is shown in its maximum upper position while heddle 24 is in its lowest position. The relative position of the heddles at any instant depends upon the shed being formed to weave a given pattern. Coil springs 70 mounted in sockets 60 serve to counterbalance the weight of the heddles and contribute to the ease of moving the same.

From this construction, it is apparent that after the warp 36 has been threaded through the heddles, the shed may be created by the raising or lowering of various combinations of warp threads to give patterns other than the conventional basket weave.

In the preferred manner of operating the loom, the shed is formed only by depressing the heddles from their centered position in the spring members 62. Assuming heddle 22 to be in centered position, then heddle 24 will be manually depressed to form a shed G. After the shuttle has been passed through the shed, the swords E are swung toward the cloth beam 8 to beat up the weft. However, at this time it is necessary that all the heddles be in neutral position and centered with respect to the reed 20. Consequently, a cam H supported by rods 71 secured to cross beam D is positioned to cam against the bottoms of the heddles and move them into centered position as the reed is swung forwardly. Under certain conditions, as when large warp threads are being used, it may be desirable to increase the depth of shed, and in such instance the heddle 22 may be raised to the upper notched position as shown in Fig. 5. This heddle will then be manually depressed as the reed is swung forwardly. When the reed is swung back from the beating-up function, the counter-shed is formed by manually depressing the reed 22, the reed 24 remaining in centered position, or if desired, raised to create a deeper shed. Although only two heddles have been illustratd, it is clear that the number of heddles can be increased and that they can be successively operated in accordance with the pattern to be woven.

Figure 8:
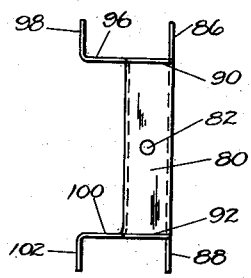
Fig. 8 is a front elevational view, exaggerated in size, of a dent.
Figure 9:
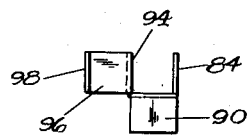
Fig. 9 is a top plan view of the dent of Fig. 8.
Figure 10:
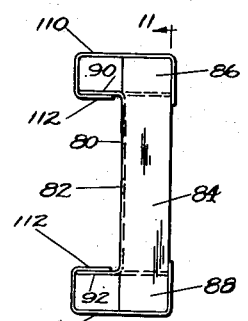
Fig. 10 is a cross-sectional view on the line 10—10 of Fig. 5.

For purposes of hand weaving, it is desirable that the operator can set up the loom for warp of different coarseness and to be able to weave different types of cloth by varying from time to time the number of warp threads per inch, all depending upon the size of the warp being used and type of cloth desired. In order that this may be done, the reed and heddles are constructed with removable dents, and the dents themselves are of simple self-spacing construction and can be made in varying sizes so that a particular set can be fitted into the reed or heddle frame for the particular size warp or the desired number of warp threads per inch. In Figs. 8 to 10, the dent is constructed of sheet metal bent to form, or metal or plastic cast to form, and consists of a face plate 80 having an aperture 82 therein through which a warp thread is adapted to pass. This face plate is reinforced by a first rearwardly extending flange 84 which is projected at 86 above, and 88 below, the face plate 80 to provide extensions to fit in the holding frame. The face plate 80 is provided with a horizontally outwardly projecting upper flange 90 and a similar lower flange 92. A second flange 94 extends rearwardly from the face plate 80 parallel to flange 84. The upper end of this flange is projected into a horizontal flange 96 and then into an upperwardly extending flange 98, which is parallel to flange 86. Similarly, the lower end of flange 94 is projected into a horizontal flange 100 and downwardly extending flange 102. The reed or heddle frame is formed in the shape of a pair of similar channels 110 forming the upper and lower members of the frame and each provided with an inwardly turned flange 112. The ends of these channels are joined by side members 114 to which the lugs 64 are secured.

Figure 11:
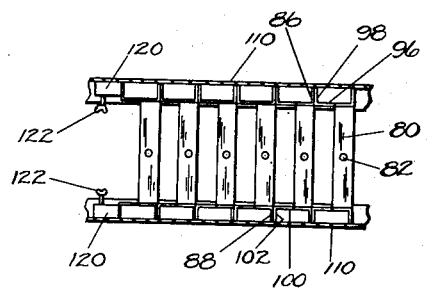
Fig. 11 is a cross-sectional view on the line 11—11 of Fig. 10.

After a set of dents of proper size has been selected, the individual dents are inserted into channels 110, the flanges 112 terminating short of the end members 114 so that the dents may be inserted. The dents are placed with the flanges 90 and 92, contacting and sliding along the inner surfaces of flanges 112 on channels 110, and the dents are spaced properly by means of flanges 98 abutting flanges 86 on adjacent dents. These last named flanges likewise contact the inner surfaces of the channels 110 and serve to maintain the dents in position. After the dents have been assembled, they are secured against displacement by blocks 120, note Figs. 6 and 11, inserted in the channels 110 at the end of the channels and fastened into position by set screws 122. This structure is set forth generically in my copending application Serial No. 214,140 filed March 6, 1951.

Figure 13:
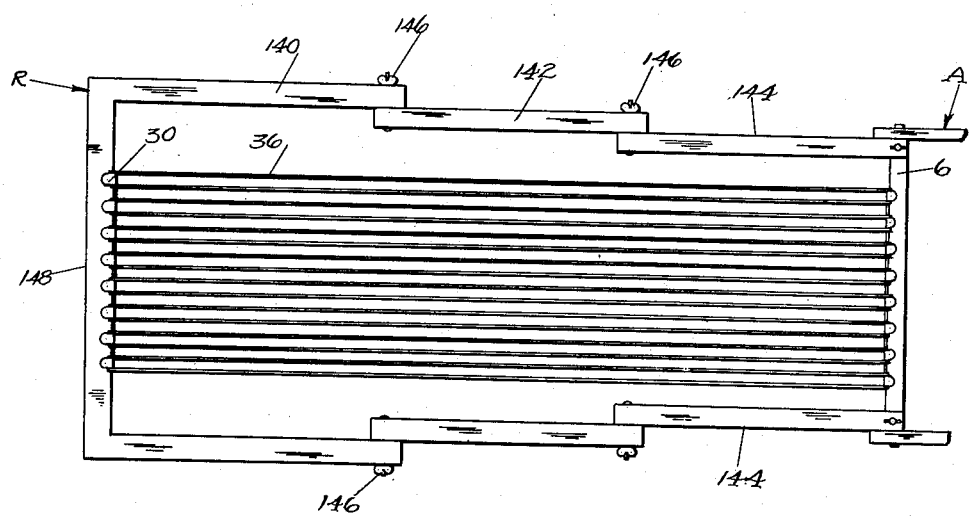
Fig. 13 is a plan view of an extensible frame for laying out the warp.

In any weaving process, the setting up of the warp is a tedious process because of the number of warp threads needed to make a piece of cloth of any appreciable width. In order to facilitate the setting up of the warp for hand looms, a rack R, Fig. 13, has been devised. This rack consists of a number of members 140, 142 and 144 pivotally joined at their ends so that the rack can be folded into a compact pile. If desired, the rack members can be secured together by bolts provided with wing nuts 146, so that it can be easily disassembled. Members 144 of this rack are detachably secured to warp beam 6 of weaving frame A. The other end 148 of the rack is provided with a warp holding strip 30 similar to that shown in Fig. 12. Consequently, when the rack is in assembled or open position and laid out in a room on the floor, or supported upon tables or chairs, the warp threads 36 can be strung out between the warp beam 6 and the end member 148. After the warp threads have been set up, they can be detached from the member 148 and the warp beam 6 rotated so as to wind the warp threads thereon. The free end of the warp threads, which have been detached from member 148, are then available to be threaded through the heddles and the reed and secured upon the cloth beam ready for the weaving process. In the meanwhile, the rack R can be taken down and disassembled.

Figure 14:
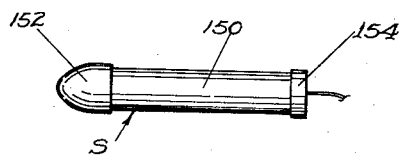
Fig. 14 is a side elevational view of a shuttle.
Figure 15:
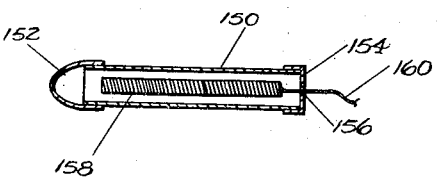
Fig. 15 is a cross-sectional view of the shuttle shown in Fig. 14.

Because the invention contemplates the weaving of a piece of cloth of considerable width as compared with the hand looms which merely weave strips of cloth for neckties or scarves, it is desirable to have a hand shuttle S which can be passed easily through the shed and which carries its own supply of weft in somewhat the manner of machine operated shuttles. Such a shuttle is shown in Figs. 14 and 15, and consists of a lightweight cylinder 150 closed at its fore end by a blunt nose cap 152 and at its rear end by a cap 154 provided with an aperture 156. The interior of the shuttle carries a cop 158 constituting the weft supply, the weft 160 being pulled out of the shuttle through the aperture 156.

Figures 16, 17:
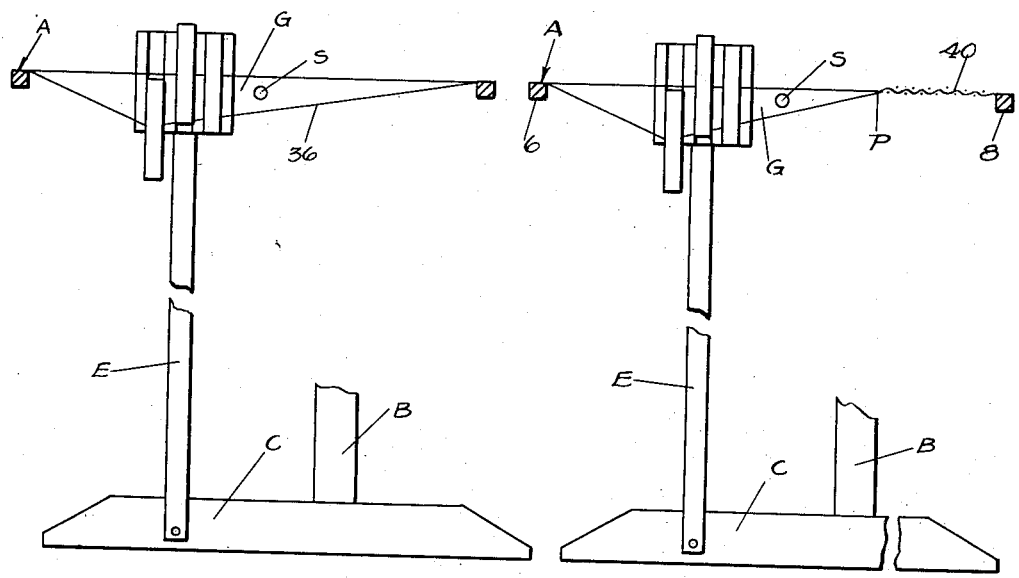
Fig. 16 is a diagrammatical view showing the shed obtained when the weaving frame is in a horizontal plane.
Fig. 17 is a view similar to Fig. 16, but showing the variation in the depth of the shed as the cloth grows.
Figure 18:
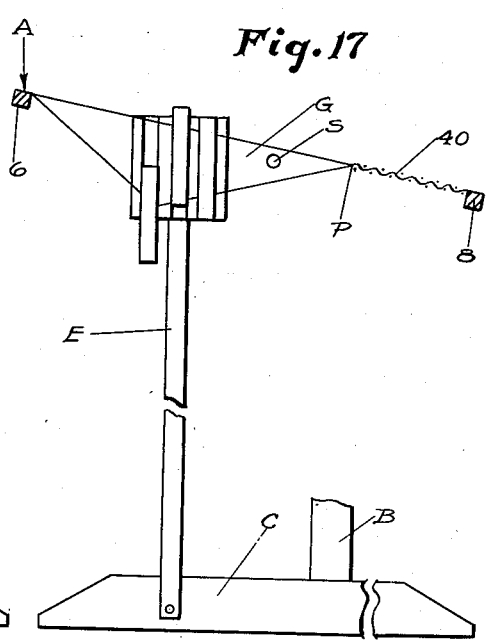
Fig. 18 is a similar view, but showing the increase in depth of the shed obtained by tilting the weaving frame.

In Figs. 16 to 18, an additional function of the tilting of the frame A, when multiple heddles are being used, is illustrated diagrammatically. This consists in using the tilting of the frame to keep a shed deep enough to pass the shuttle through even though the cloth has grown to a considerable extent upon the frame A. Fig. 16 discloses the frame A in horizontal position prior to the beginning of the weaving with the shuttle indicated at S passing through the shed G. In Fig. 17, the cloth 40 has grown from the beam 8 to the point P, and the depth of the shed G correspondingly decreased, offering less room for the passage of the shuttle S. In Fig. 18, the cloth beam 8 has been pushed downwardly by tilting frame A, and in so doing increases the depth of shed G so that the shuttle may be passed therethrough. This diagrammatic showing is exaggerated somewhat in order to illustrate the principle of the invention, it being apparent that there needs to be only a slight increase in the depth of the shed to make the difference between a blocked or a clear passage for the shuttle. As the weaver does not have to stop to wind up the cloth on the cloth beam until a considerable width of the cloth has been woven, the speed of weaving is materially increased. At the same time, as the frame may be tilted downwardly toward the weaver, the distance between the weaver and the point P is decreased so that the weaver is able to reach the point at which the shuttle is being passed through the shed and his weaving operation is thus facilitated.

Figure 19:
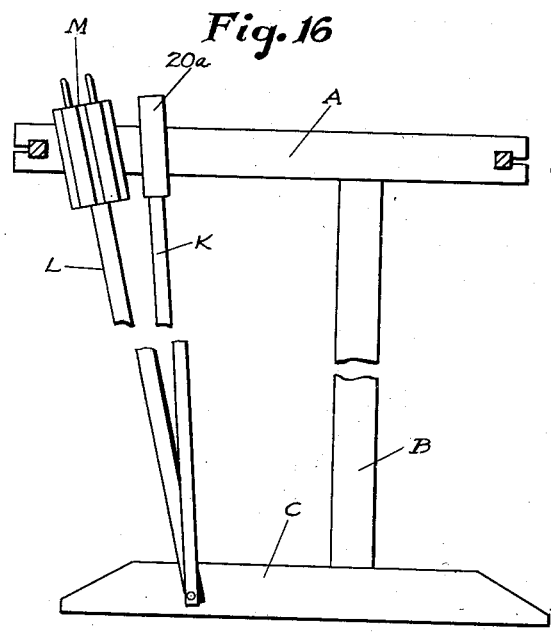
Fig. 19 is a diagrammatical view following Fig. 5 showing a modified form of my invention.

Although the invention has thus far been illustrated with respect to the reed and heddle being mounted upon the same swords E, it is possible to mount the reed and heddles upon separate swords K and L, as diagrammatically indicated in Fig. 19. The reed 20a in this instance functions to beat or lay up the weft while the heddles M can be secured in any position relative to the frame A so as to give the maximum shed with respect to the point to which the cloth has grown.

It is apparent that by this invention I have constructed a hand loom which will produce cloths of widths and patterns not heretofore produced by hand looms, which is of inexpensive construction and compact enough so that it can be used as a household item and readily stored when not in use.

Having now described the means by which I obtained the objects of my invention, I claim:

1. A hand loom comprising a weaving frame, means for tiltably supporting said frame for movement from a horizontal plane, a reed, a plurality of heddles, means for supporting said reed and heddles for arcuate movement through the plane of said frame, and means mounting said heddles for vertical movement in said supporting means.

2. A hand loom as in claim 1, said supporting means comprising a pair of swords, grooved blocks carried by said swords, said reed and heddles being mounted in the grooves and extending between said blocks, and means for adjustably mounting said heddles in said blocks.

3. A hand loom as in claim 1, further comprising cam means for moving said heddles to a centered position with respect to said reed upon actuating of said supporting means for arcuate movement.

4. A loom comprising a weaving frame including a warp beam and a cloth beam joined by side rails, pivotal mounting means for said side rails whereby said frame is tiltable by alternately raising and depressing said warp and cloth beams, respectively; a combined reed and heddle of alternate eye and slot construction, means mounting said reed and heddle for standing substantially vertically and swingable toward said cloth beam, said reed and heddle when standing substantially vertically being nearer said warp beam then to said cloth beam whereby alternate sheds of warp are formed when said frame is tilted, and the eyes of said reed and heddle lying substantially in the plane of said frame when said reed and heddle is swung to a position adjacent said cloth beam and said cloth beam is slightly depressed whereby weft is beaten up substantially in the plane of said frame.

THOMAS H. CLACK.

REFERENCES CITED

The following references are of record in the file of this patent:

UNITED STATES PATENTS

| Number | Name | Date |
| --- | --- | --- |
| 65,997 | Browne | June 25, 1867 |
| 459,784 | Hill | Sept. 22, 1891 |
| 604,804 | Sturges | May 31, 1898 |
| 688,500 | Booze | Dec. 10, 1901 |
| 1,214,948 | Ojerholm | Feb. 6, 1917 |
| 1,335,163 | Haag | Mar. 30, 1920 |
| 2,166,415 | Lervad | July 18, 1939 |
| 2,186,692 | Bover | Jan. 9, 1940 |
| 2,209,597 | Clark | July 30, 1940 |
| 2,241,318 | Robson | May 6, 1941 |
| 2,257,455 | Clark | Sept. 30, 1941 |

FOREIGN PATENTS

| Number | Country | Date |
| --- | --- | --- |
| 69,010 | Germany | June 8, 1893 |
| 599,280 | Germany | June 29, 1934 |